United States Patent
Xu et al.

(10) Patent No.: US 8,139,880 B2
(45) Date of Patent: Mar. 20, 2012

(54) LIFTING-BASED DIRECTIONAL LAPPED TRANSFORMS

(75) Inventors: Ji-Zheng Xu, Beijing (CN); Feng Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1031 days.

(21) Appl. No.: 12/054,043

(22) Filed: Mar. 24, 2008

(65) Prior Publication Data

US 2009/0238484 A1    Sep. 24, 2009

(51) Int. Cl.
G06K 9/36    (2006.01)
(52) U.S. Cl. .................. 382/250; 382/240; 375/240.03; 375/240.25; 704/500
(58) Field of Classification Search .................. 382/232, 382/240, 250; 375/240.03, 240.25; 704/500
See application file for complete search history.

(56) References Cited

U.S. PATENT DOCUMENTS

| | | | |
|---|---|---|---|
| 6,421,464 B1 * | 7/2002 | Tran et al. ..................... | 382/232 |
| 6,487,574 B1 | 11/2002 | Malvar | |
| 7,120,297 B2 | 10/2006 | Simard et al. | |
| 7,305,139 B2 | 12/2007 | Srinivasan | |
| 7,315,822 B2 | 1/2008 | Li | |
| 2005/0053150 A1 | 3/2005 | Hsu | |
| 2006/0008164 A1 | 1/2006 | Wu | |
| 2006/0133684 A1 * | 6/2006 | Srinivasan et al. ............ | 382/250 |
| 2006/0285760 A1 | 12/2006 | Malvar | |
| 2006/0288065 A1 | 12/2006 | Lelescu | |
| 2007/0036223 A1 | 2/2007 | Srinivasan | |
| 2007/0036225 A1 | 2/2007 | Srinivasan | |

OTHER PUBLICATIONS

Chang et al.; "Direction-adaptive discrete wavelet transform via directional lifting and bandeletization"; IEEE International Conference on Image Processing Oct. 2006; 1149-1152.*
Ding et al.; "Adaptive directional lifting-based wavelet transform for image coding"; IEEE Transactions on Image Processing, Feb. 2007; 416-427.*
Aach, T., D. Kunz, A lapped directional transform for spectral image analysis and its application to restoration and enhancement, J. Signal Processing, Nov. 2000, pp. 2347-2364, vol. 80, No. 11, Elsevier North-Holland, Inc. Amsterdam, The Netherlands.
Ding, W., F. Wu, X. Wu, S. Li, and H. Li, Adaptive directional lifting-based wavelet transform for image coding, IEEE Trans. on Image Processing, vol. 16, No. 2, Feb. 2007, pp. 416-427.
Freescale Semiconductor, Inc., JPEG2000 wavelet transform on StarCore based DSPs, Application Note, Nov. 2004, pp. 1-44.
Liang, J., T. D. Tran, Fast multiplierless approximations of the DCT with the lifting scheme, IEEE Trans. on Signal Processing, Dec. 2001, pp. 3032-3044, vol. 49, No. 12.

(Continued)

*Primary Examiner* — Matthew Bella
*Assistant Examiner* — Eueng-Nan Yeh
(74) *Attorney, Agent, or Firm* — Lyon & Harr, LLP; Mark A. Watson

(57) ABSTRACT

A "directional lapped transform coder" ("DLT Coder") provides various techniques for designing directional lapped transforms. In general, lapped transforms are factorized into lifting steps. A "directional operator" is then introduced into each lifting step in order to construct the directional lapped transform by selecting data elements from a data signal along a path corresponding to the directional operator. The resulting directional lapped transform preserves the advantages of conventional lapped transforms while also providing more efficient representation directional signals. In various embodiments, the resulting directional lapped transform is used to enable an image/video coding scheme that provides significant improvement over conventional state-of-the-art image lapped transform based coding schemes for images with strong directional correlations.

20 Claims, 7 Drawing Sheets

OTHER PUBLICATIONS

Malvar, H. S., Biorthogonal and nonuniform lapped transforms for transform coding with reduced blocking and ringing artifacts, IEEE Trans. Signal Processing, Apr. 1998, pp. 1043-1053.

Malvar, H. S., Fast progressive image coding without wavelets, Proc. Data Compression Conf., Mar. 2000, pp. 243-252, Snowbird, UT.

Malvar, H. S. and D. H. Staelin, The LOT: Transform coding without blocking effects, IEEE Trans. on Acoustics, Speech, and Signal Processing, Apr. 1989, vol. 37, pp. 553-559.

Selesnick, I. W., R. G. Baraniuk, and N. G. Kingsbury, The dual-tree complex wavelet transform, IEEE Signal Processing Magazine, Nov. 2005, vol. 22, pp. 123-151.

Simone, F. D., M. Quaret, F. Dufaus, A. G. Tescher and T. Ebrahimi, A comparative study of JPEG 2000, AVC/H.264, and HD Photo, SPIE Optics and Photonics, Applications of Digital Image Processing XXX, Aug. 2007, vol. 6696.

Srinivasan, S., An introduction to HD Photo, Jan. 2007.

Starck, J. L., E. J. Candes and D. L. Donoho, The curvelet transform for image denoising, IEEE Trans. on Image Processing, Jun. 2002, vol. 11, No. 6, pp. 670-684.

Tanaka, T., Y. Yamashita, A lapped biorthogonal transform adapted for local directionality of images and its applications in image coding, Institute of Electronics, Information and Communication Engineers Technical Report, Apr. 2001, pp. 1-8, vol. 101, No. 18.

Tran, T.D., J. Liang, C. Tu, Lapped Transform via Time-Domain Pre- and Post-Filtering, IEEE Transactions on Signal Processing, Jun. 2003, pp. 1557-1571, vol. 51, No. 6, IEEE Signal Processing Society.

Xu, H., J. Xu and F. Wu, Lifting-based directional DCT-like transform for image coding, IEEE Trans. on Circuits and Systems for Video Technology, Oct. 2007, pp. 1325-1335, vol. 17, No. 10.

Zeng, B., and J. Fu, Directional discrete cosine transforms for image coding, IEEE Int'l Conf. on Multimedia and Expo, Jul. 2006, pp. 721-724, Dept. of Electr. & Electron. Eng., Hong Kong Univ. of Sci. & Technol., Kowloon.

* cited by examiner

LIFTING-BASED DIRECTIONAL LAPPED TRANSFORMS

BACKGROUND

1. Technical Field

A "directional lapped transform coder," or "DLT Coder," provides techniques for designing "directional lapped transforms," and in particular, various techniques for performing lifting factorization of lapped transforms, with a "directional operator" then being applied in each lifting step to construct directional lapped transforms for use in coding signals of two or more dimensions.

2. Related Art

Typical block-based transforms, such as the well-known discrete cosine transform (DCT), have been widely used in image and video coding standards such as, for example, JPEG, MPEG-1/2/4, H.261/3/4, etc. In these coding standards, images are divided into small blocks on which the transform is applied. While such block-based schemes generally make the complexity of the transform low for most applications, blocking artifacts tend to increase in severity when the bit-rates are low. Furthermore, typical transform schemes do not exploit inter-block correlation. As a result, the coding efficiency of such transform schemes is not optimal.

As an alternative to block-based DCT-based schemes, the concept of "lapped transforms" is sometimes used. As is known to those skilled in the art, with lapped transforms, the transform blocks are overlapped. This overlapping allows lapped transforms to partially exploit inter-block correlations and reduce blocking artifacts significantly.

Various practical image coding schemes based on lapped transforms have demonstrated superior coding performance relative to traditional DCT-based image coding. Further, the computational complexity of lapped transform based coding schemes is not significantly greater than that of conventional DCT-based image coding. For example, compared to the well-known JPEG 2000 coding standard, which is based on wavelet transforms, one conventional lapped transform based scheme, referred to as "HD Photo," provides comparable coding performance, but with lower complexity than JPEG 2000.

However, when applied in image or video coding, both 2D DCT and 2D lapped transforms are computed using two separable 1D transforms, i.e., horizontal and vertical transforms. In general, this type of separable design allows the transform to adequately capture both horizontal and vertical information. However, in typical images, there is no guarantee that that the information in those images is along the vertical or horizontal direction. Consequently, conventional separable transform based schemes tend not to adequately account for information that is not along one of the two directions.

On the other hand, conventional DCT generally approximates an optimal linear transform, such as the well-known Karhunen-Loève (KL) transform, given the assumption that the correlation of the signal is isotropic and strong. Unfortunately, this assumption is generally not true for most images, either natural or artificial. In particular, the correlation generally changes from region to region, and is likely to be stronger along some particular direction from region to region. However, this direction of strongest correlation is not necessarily horizontal or vertical.

Recently several conventional transforms have been proposed for use in image representation or image coding that provide directional bases. These directional schemes are generally classified into one of two categories. In the first category, new transforms are introduced to incorporate directional bases, like "curvelets," and "dual tree complex wavelets." The transforms of the second category are modified from the existing transforms. As is known to those skilled in the art, this second category includes "directional wavelet transforms" and "directional DCT transforms."

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, a "directional lapped transform coder," also referred to herein as a "DLT Coder," provides various techniques for constructing "directional lapped transforms" for use in coding data signals of two or more dimensions. In general, the DLT Coder constructs a directional lapped transform by applying lifting-based techniques to lapped transforms in combination with a "directional operator" that is applied at each lifting step of the lapped transform.

The directional operator for each lifting step indicates a strongest direction of correlation for each macro-block of the data signal. In general, inter-block correlation increases in strength as the block size becomes smaller. Therefore, in various embodiments, a size of each macro-block is set based on a desired level of granularity. Note that block size can be adjusted or set either automatically or via a user interface.

More specifically, lifting steps are factorized from conventional lapped transforms to form a lifting-based pre-filtering stage and a lifting-based discrete cosine transform (DCT) stage. Together, the pre-filtering stage and the DCT stage form a conventional lifting-based lapped transform. The aforementioned directional operator is then applied at each lifting step by selecting data elements for populating the lifting steps from the macro-blocks of the data signal along the selected direction to replace the existing elements of the pre-filtering stage and the DCT stage. The result of this selective population of the lifting steps is a novel directional lapped transform having lifting steps that are automatically tailored to fit the specific data being coded.

The resulting directional lapped transforms inherits the advantages of lapped transform, e.g., less blocking artifacts, better coding efficiency, lower computational complexity, etc. Unlike conventional lapped transforms, directional lapped transforms can efficiently de-correlate directional signals. Consequently, the DLT Coder described herein has advantages for uses such as image coding (2D signals), filtering of seismic data (3D signals), etc.

In view of the above summary, it is clear that the DLT Coder described herein provides various unique techniques for constructing directional lapped transforms for using in coding data signals of two or more dimensions dimensionality. In addition to the just described benefits, other advantages of the DLT Coder will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

As is well known to those skilled in the art, lapped transforms are frequently used in various signal-processing operations for signals of two or more dimensions. For example, typical applications for lapped transforms include image encoding and decoding (2D signals), filtering of seismic data (3D signals), etc. It should be noted that for purposes of explanation, the following discussion will generally refer to the use of "directional lapped transforms" in the context of coding of 2D signals such as images. However, it should be understood that the concepts described herein may be generalized to coding signals of arbitrary dimensionality of two or more dimensions.

In general, a "directional lapped transform coder," also referred to herein as a "DLT Coder," provides various techniques for constructing directional lapped transforms. As described in detail herein, in various embodiments, the DLT Coder generally constructs a directional lapped transform by using lifting-based techniques in combination with a "directional operator" that is applied at each lifting step of the lapped transform. The directional operator for each lifting step is determined using any of a variety of optimization techniques that determine a strongest direction of correlation for each block of the data signal.

More specifically, lifting steps are factorized from conventional lapped transforms to form a lifting-based pre-filtering stage and a lifting-based DCT stage. The directional operator is then applied at each lifting step of both the pre-filtering stage and the DCT stage to select data elements from along a "path" corresponding to the selected direction from overlapping blocks of data signal. The selected data elements are used to replace the existing elements of the pre-filtering stage and the DCT stage of the lapped transform to form a directional lapped transform.

Figure 1:
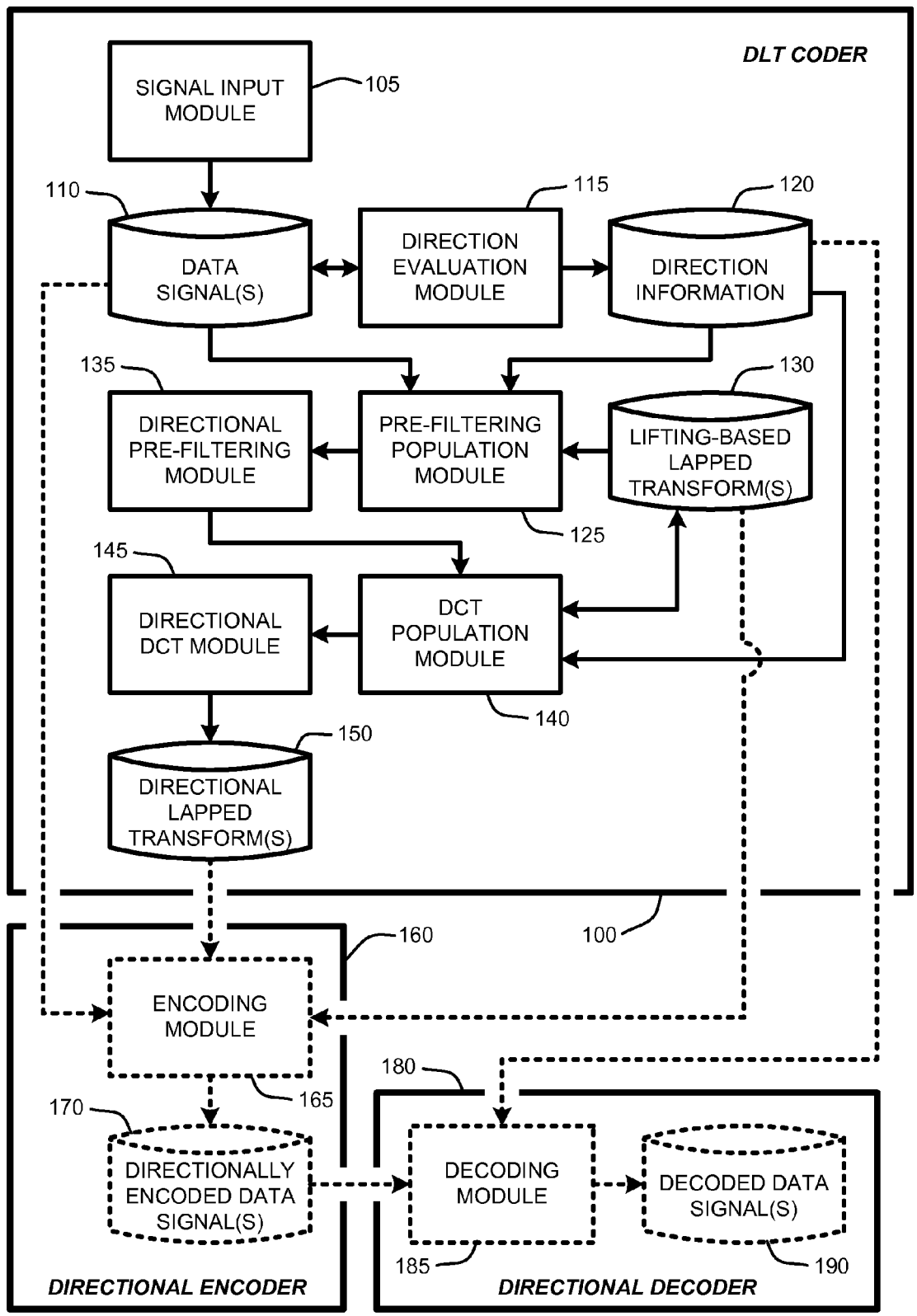
FIG. 1 provides an exemplary architectural flow diagram that illustrates program modules for implementing various embodiments of a directional lapped transform coder, i.e., a "DLT Coder," as described herein.

1.1 System Overview:

As noted above, the DLT Coder provides various techniques for constructing directional lapped transforms for coding or processing signals of arbitrary dimensionality of two or more dimensions. The processes summarized above are illustrated by the general system diagram of FIG. 1. In particular, the system diagram of FIG. 1 illustrates the interrelationships between program modules for implementing various embodiments of the DLT Coder, as described herein. Furthermore, while the system diagram of FIG. 1 illustrates a high-level view of various embodiments of the DLT Coder, FIG. 1 is not intended to provide an exhaustive or complete illustration of every possible embodiment of the DLT Coder as described throughout this document.

In addition, it should be noted that any boxes and interconnections between boxes that are represented by broken or dashed lines in FIG. 1 represent alternate embodiments of the DLT Coder described herein, and that any or all of these alternate embodiments, as described below, may be used in combination with other alternate embodiments that are described throughout this document.

In general, as illustrated by FIG. 1, the processes enabled by the DLT Coder 100 begin operation by using a signal input module 105 to receive a data signal 110, such as, for example, an image file that is a 2D signal having data elements represented by rows and columns of image pixels. Such data signals 110 can be either pre-recorded and stored on some type of computer-readable medium, or can be captured live from some signal input source (such as a digital camera in the case of images).

Regardless of the source of the data signal 110, once received by the DLT Coder 100, the DLT Coder passes the data signal to a direction evaluation module 115 that examines blocks or macro-blocks of the signal to determine a strongest direction of correlation for each block or macro-block of the signal. Note that macro-blocks are comprised of multiple blocks of neighboring data elements. For example, in the case of an image file, a block of data represents some number of neighboring image pixels, such as, for example, a 4×4 group of neighboring pixels. In contrast, a macro-block represents neighboring blocks, such as, for example a 16×16 size macro-block would include sixteen 4×4 neighboring blocks of 4×4 pixel elements.

In various embodiments, the direction evaluation module 115 determines correlation direction either on a block basis, or on a macro-block basis, with block or macro-block size being any desired size, from single data element (e.g., individual pixels in the case of an image) up to any size desired. However, it should be noted that correlation direction strength tends to increase as size decreases, such that selection of overly large block or macro-block sizes can lead to artifacts in coded data signals.

Once the direction evaluation module 115 has determined the directions for each block or macro-block, that direction information 120 is stored as "side information" for later use, as described in further detail below. In various embodiments, the side information represented by the direction information 120 is either encoded directly into the data signal, or provided as a companion data stream for use in encoding and decoding the data signal, as described in further detail below.

Next, a pre-filtering population module 125 receives the data signal 110, the direction information 120, and a lifting-based pre-filtering stage from a conventional lifting-based lapped transform 130 that includes one or more 1D lapped transforms. As noted above, a lapped transform of 2 or more dimensions that is assumed to be separable can be constructed as a set of 1D lapped transforms that may be combined to form the higher dimensional lapped transform. For each data element in the data signal 110, the pre-filtering population module 125 then follows a path from that data element using the direction of the corresponding block or macro-block and selects data elements along that path. The selected data elements are used to replace corresponding elements of each lifting step of the pre-filtering stage to construct a directional pre-filter for use by a directional pre-filtering module 135.

Figure 5:
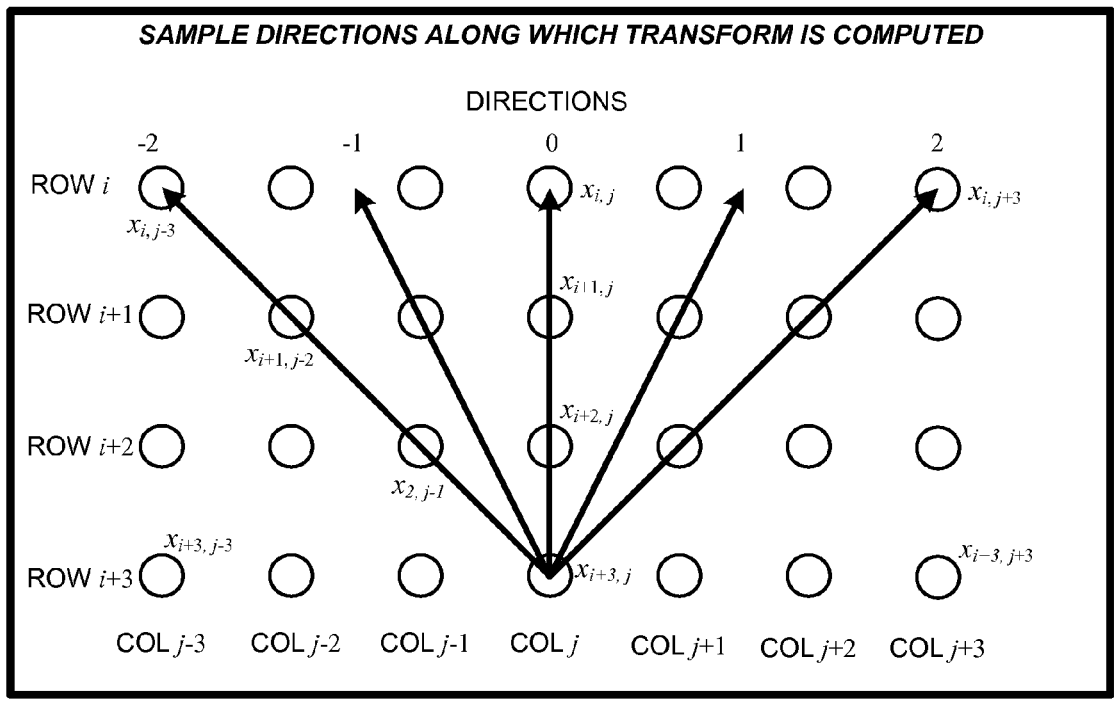
FIG. 5 illustrates a set of neighboring pixels and sample correlation directions for determining directional operators for overlapping blocks of pixels, as described herein.

Further, as described in greater detail in section 2.3, with respect to FIG. 5, the directional path may not always not directly intersect a data element of the data signal at one or more particular points along the path. In this case, the pre-filtering population module 125 uses various methods, such as, for example, interpolation or data averaging, to generate a corresponding data value for use in selectively populating the pre-filter stage.

Once the pre-filtering population module 125 has constructed the directional pre-filter for use by the directional pre-filtering module 135, the directional pre-filter module 135 then performs a directional lifting-based pre-filtering of the data signal 110.

The pre-filtered data signal computed by the directional pre-filtering module 135 is then provided to a DCT population module 140. The DCT population module 140 also receives the direction information 120 and a lifting-based DCT stage from the conventional lifting-based lapped transform 130. For each data element in the filtered data signal, the DCT population module 140 then follows a path from that data element using the direction of the corresponding block or macro-block and selects pre-filtered data elements along that path. The selected pre-filtered data elements are then used to replace corresponding elements of each lifting step of the DCT stage to construct a directional DCT for use by a directional DCT module 145.

Similar to population of the pre-filter stage, the directional path through the pre-filtered data elements may not always directly intersect a pre-filtered data element of the data signal at one or more particular points along the path. In this case, the DCT population module 140 uses various methods, such as, for example, interpolation or data averaging, to generate a corresponding data value for use in selectively populating the DCT stage to construct the directional DCT.

The directional DCT module 145 then performs a lifting-based directional discrete cosign transform of the pre-filtered data signal. The combination of directional pre-filtering performed by the directional pre-filtering module 135 and the directional DCT performed by the directional DCT module 145 results in a directional lapped transform 150 of the data signal 110. This directional lapped transform 150 of the data signal 110 is then available for use in coding or other processing of the data signal, as desired.

As is well known to those skilled in the art, typical encoders use separable lapped transforms to provide two or more 1D lapped transforms that are combined to produce a lapped transform of the dimensionality of the data signal. For example, in the case of image encoding, a typical encoder will use a 1D vertical lapped transform in combination with a 1D horizontal lapped transform to compute a 2D transform of the image.

However, in contrast to conventional coders, in various embodiments, the directional lapped transform 150 described above is provided to a directional encoder 160 that uses an encoding module 165 to perform directional encoding of the data signal. In other words, in the case of the directional encoder 160 described herein, one or more of the 1D lapped transforms are replaced with the corresponding directional lapped transform described above. For example, in one embodiment for encoding images, the vertical lapped transform of a conventional lapped transform is replaced with the directional lapped transform described above. The horizontal lapped transform in this example does not need to be replaced with a directional lapped transform, but is can be, if desired.

In this example, the resulting image coding provided by the encoding module 165 thus performs a directional lapped transform in combination with a horizontal lapped transform to produce a directionally encoded data signal 170. Note that a detailed example of directional encoding of an image is provided in Section 2.4. Further, as noted above, it should be clear that the use of directional lapped transforms is not limited to use encoding images or other 2D signals, and that signals of any dimensionality of two or more dimensions may be encoded using the directional lapped transforms 150 described herein. In addition, it should also be noted that the direction information 120 can also be encoded into the data signal, or provided as a side stream, for use in directional decoding of encoded data signals.

In particular, in another embodiment, directionally encoded data signals 170 are provided to a directional decoder 180 that uses a decoding module 185 to perform decoding with inverse directional lapped transforms to recover a decoded data signal 190. Given the original lapped transform 130, the decoding module 185 uses the direction information 130 (either extracted from the directionally encoded data signal 170 or received as a side stream) to construct an inverse directional lapped transform that is simply inserted into the decoding process to replace the corresponding inverse lapped transform.

2.0 Operation Overview:

The above-described program modules are employed for implementing various embodiments of the directional lapped transform coder. As summarized above, the DLT Coder provides various techniques for constructing directional lapped transforms for use in coding or other processing of signals of arbitrary dimensionality of two or more dimensions. The following sections provide a detailed discussion of the operation of various embodiments of the DLT Coder, and of exemplary methods for implementing the program modules described in Section 1 with respect to FIG. 1.

2.1 Operational Details of the Directional Lapped Transform Coder:

In general, the DLT Coder provides various techniques for constructing and using directional lapped transforms. The following paragraphs provide an examples and operational details of various embodiments of the DLT Coder, including: a conventional lifting implementation of separable lapped transforms; directional lapped transforms; image coding using directional lapped transforms; and additional embodiments and considerations of the DLT Coder.

2.2 Conventional Lifting Implementation of Lapped Transforms:

As is well known to those skilled in the art, to apply a conventional M-band lapped transform, the signal is divided into overlapping blocks with length L, where L>M. Then, the transform is applied to each block to generate M coefficients. In other words, the transform matrix is a matrix having a size of M×L. Lapped transforms are often implemented using post-filtering following an M-band discrete cosine transform (DCT). Further, it is also well known that such processes can be equivalent to an M-band DCT after a pre-filtering stage.

Figure 2:
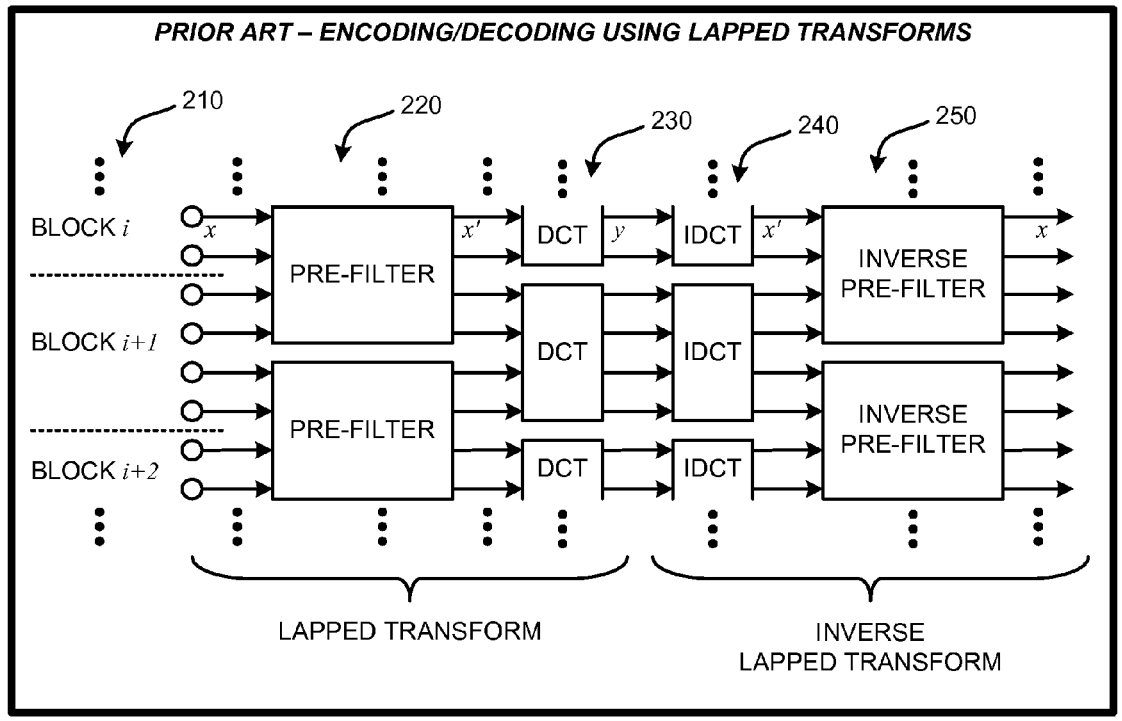
FIG. 2 illustrates shows a prior art block diagram illustrating encoding and decoding of overlapping blocks of an input signal using a lapped transform, as described herein.

As described herein, M-band DCT and pre-filtering operations used in conventional lapped transforms can be factorized into several lifting steps. In particular, a DCT-based lapped transform can be defined by two stages: 1) pre-filtering stage; and 2) a DCT stage that operates on the output of the pre-filtering stage. FIG. 2 illustrates a prior art 1D lapped transform and corresponding inverse lapped transform. As noted above, a corresponding 2D lapped transform can be viewed as two consecutive 1D transforms since it is assumed to be separable. In particular, FIG. 2 illustrates a signal divided into blocks 210 with length 4. Each pre-filtering stage 220 is applied on the first two signals of the current block and the last two of the previous block (i.e., pre-filtering is applied to overlapping blocks). After the pre-filtering stage 220, a 4-point DCT stage 230 is then applied to each block. The original blocks of the input signal can then be recovered by performing an inverse DCT stage 240 followed by an inverse pre-filter stage 250.

Figure 3:
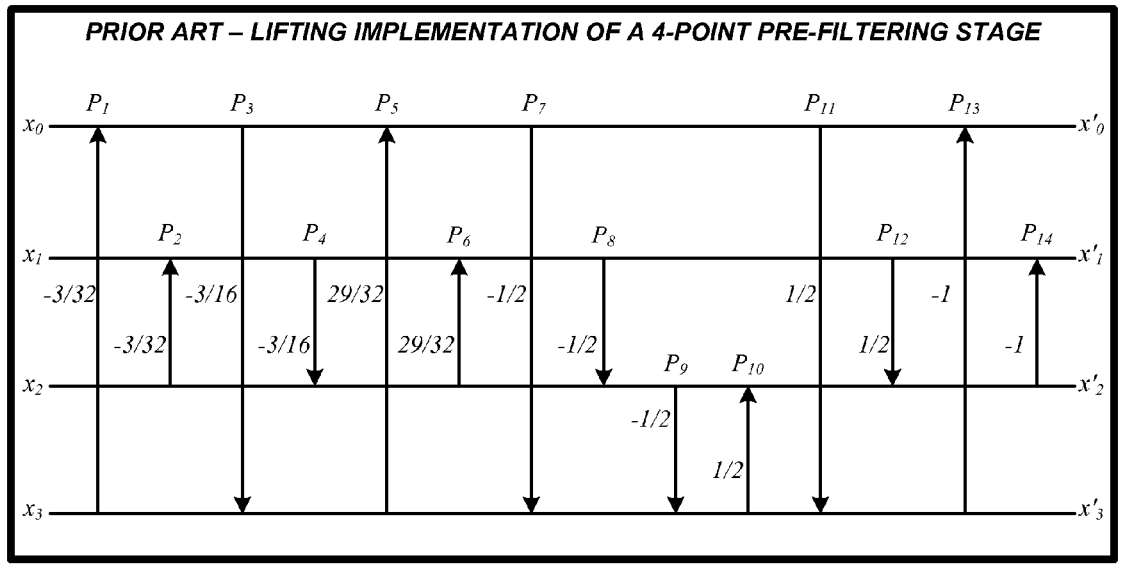
FIG. 3 illustrates a prior art diagram of a lifting implementation of a 4-point pre-filtering stage of a lifting-based lapped transform, as described herein.

The pre-filtering stage can be factorized into 14 lifting steps using conventional techniques, as shown in FIG. 3. In this case, a 4-point linear transform is illustrated so that the pre-filtering, P, can be viewed as:

$$\vec{x}' = P \cdot \vec{x} \quad \text{Equation (1)}$$

where x' and x are 4-dimensional column vectors and P is 4×4 transform matrix. Note that the use of a 4-point transform is described for purposes of explanation. However, in practice, it should be clear that transforms of any size may be used in accordance with the techniques described herein. Thus, assuming the 4-point transform, each lifting step in the pre-filtering stage shown in FIG. 3 can also be viewed as a 4×4 transform, for example:

$$P_1 = \begin{pmatrix} 1 & 0 & 0 & -3/32 \\ 0 & 1 & 0 & 0 \\ 0 & 0 & 1 & 0 \\ 0 & 0 & 0 & 1 \end{pmatrix} \quad \text{Equation (2)}$$

where the lifting steps, P are:

$$P = P_{14} \cdot P_{13} \cdot \ldots \cdot P_1 \quad \text{Equation (3)}$$

Figure 4:
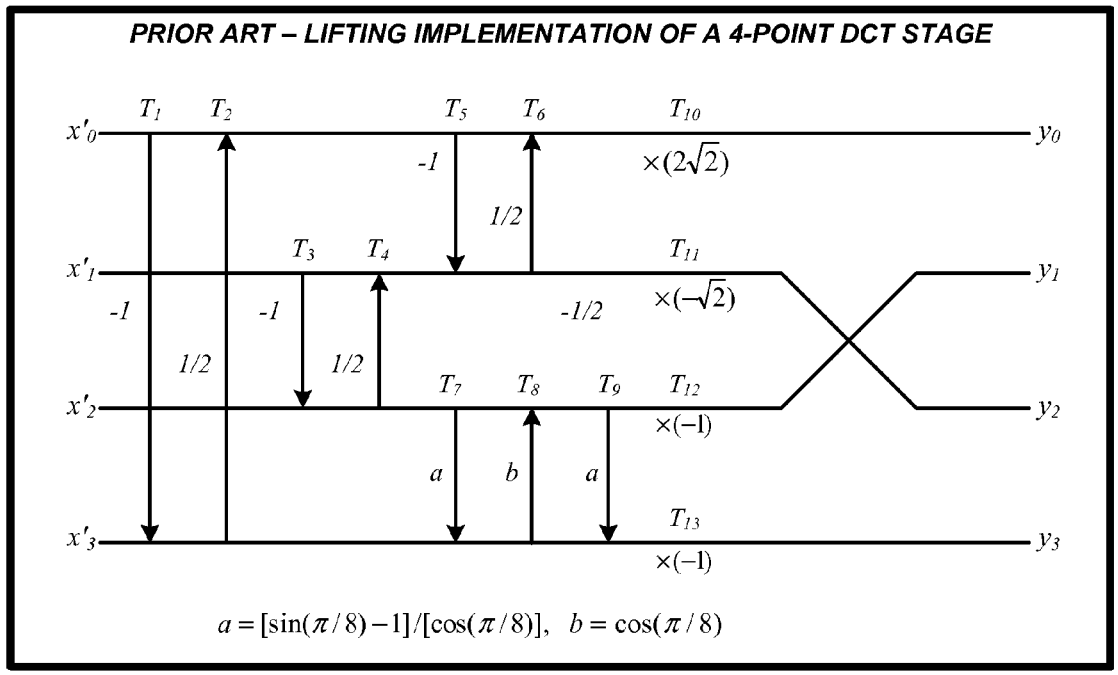
FIG. 4 illustrates a prior art diagram of a lifting implementation of a 4-point DCT stage in a lifting-based lapped transform, as described herein.

After the pre-filtering stage, the signals are transformed by 4-point DCT, which can also be implemented using conventional lifting techniques. FIG. 4 illustrates 13 lifting steps of a conventional 4-point DCT. Again, it should be noted that the use of a 4-DCT is described for purposes of explanation. However, in practice, it should be clear that transforms of any size may be used in accordance with the techniques described herein. Thus, assuming the 4-point DCT, there are 4 scaling operations, $T_{10}$ to $T_{13}$, which are also considered as lifting steps. Similar to Equation (1) and Equation (3), there are:

$$\vec{y} = T \cdot \vec{x}' \quad \text{Equation (4)}$$

$$T = T_{13} \cdot T_{12} \cdot \ldots \cdot T_1 \quad \text{Equation (5)}$$

2.3 Directional Lapped Transforms:

As noted above, conventional lapped transforms are factorized into sets of lifting steps of a pre-filtering stage and a corresponding DCT stage. Once factorized into lifting steps, the aforementioned directional operator is computed for each block or macro block of the signal and applied at each lifting step to construct the directional lapped transform. Specifically, the directional lapped transform is constructed by selectively replacing data elements from the lifting steps with data elements selected from along a path through the data elements corresponding to the selected direction. It should be noted that in view of the techniques described herein, any lapped transform that can be factorized into lifting steps can be easily modified to a corresponding directional version by factorizing the lapped transform into lifting steps, and computing the corresponding directional operator for each block to be applied at each lifting step. However, for purposes of explanation, the use of a DCT-based lapped transform for use in coding 2D signals such as images will be described in the following paragraphs.

In general, conventional lapped transforms for coding a 2D signal operates by performing two stages of lapped transforms, a vertical lapped transform and a horizontal lapped transform, since the 2D transform is assumed to be separable into two 1D transforms (i.e., separate vertical and horizontal 1D transforms). Therefore, assuming that the input of FIG. 2 is multiple lines of images (or other 2D directional signal) instead of multiple signals, FIG. 2 may also be seen as demonstrating the vertical lapped transform in image coding. A row of pixels can be denoted in z-domain as $x_j(z) = \Sigma_i x_{i,j} z^{-i}$, where $x_{i,j}$ is the pixel at j-th row, i-th column. Correspondingly, let $\vec{y(z)}$ and $\vec{x(z)}$ denote 4-dimensional vectors in the z-domain, i.e., 4-row pixels. The vertical pre-filtering and DCT can also be represented in the z-domain.

$$\vec{x'(z)} = P \cdot \vec{x(z)} = P_{14} \cdot P_{13} \cdot \ldots \cdot P_1 \cdot \vec{x(z)} \quad \text{Equation (6)}$$

$$\vec{y(z)} = T \cdot \vec{x'(z)} = T_{13} \cdot T_{12} \cdot \ldots \cdot T_1 \cdot \vec{x'(z)} \quad \text{Equation (7)}$$

The transform is automatically constructed to be along a given direction (i.e., a directional lapped transform) by selecting data elements for each lifting step from neighboring data elements along the selected direction. For purposes of explanation, five sample directions are illustrated in FIG. 5. Note that direction "0" is vertical, with a "0" direction therefore corresponding to an unmodified vertical lapped transform. However, it should be understood that in the more general case, any number of arbitrary directions from 0° to 360° are used. The examples described herein illustrating the use of five basic directions are provided only for purposes of explanation, and are not intended to limit the DLT Coder to the use of five directions. Further, while the examples described below generally show directions being selected on a block-by-block basis (or on a macro-block basis), it should be noted that directions can be selected at any desired level of granularity, down to individual data elements (e.g., individual pixels in the case of image data).

Figure 6:
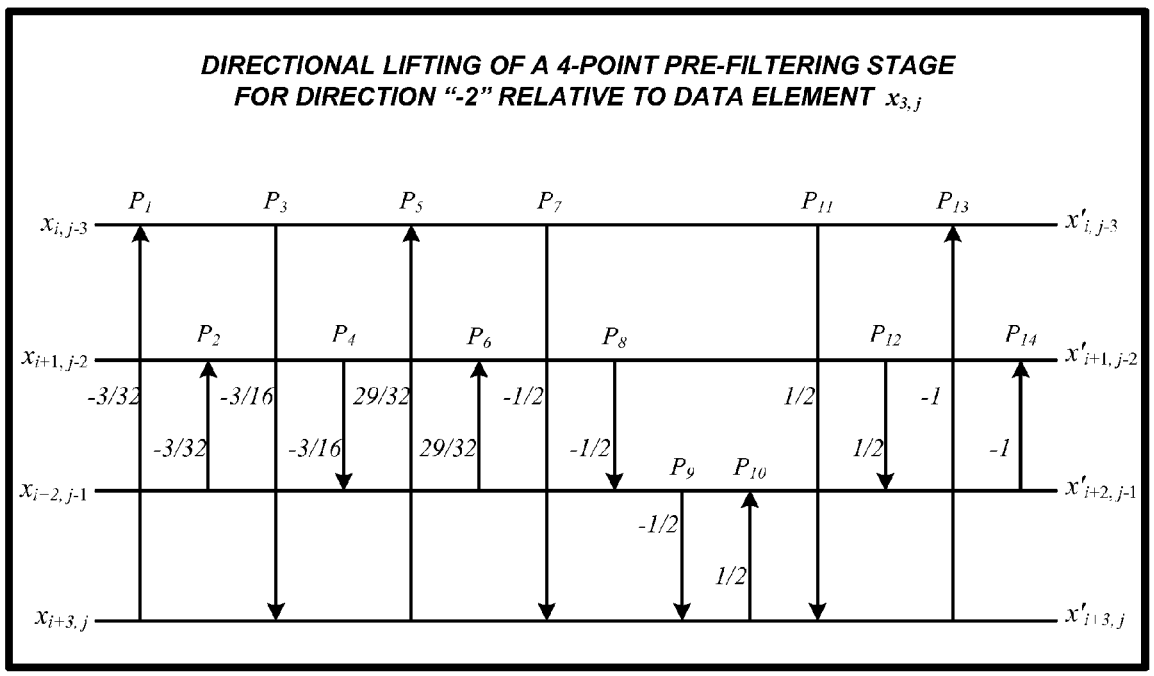
FIG. 6 illustrates a diagram of a lifting implementation of a 4-point directional pre-filtering stage in a lifting-based lapped transform, as described herein.
Figure 7:
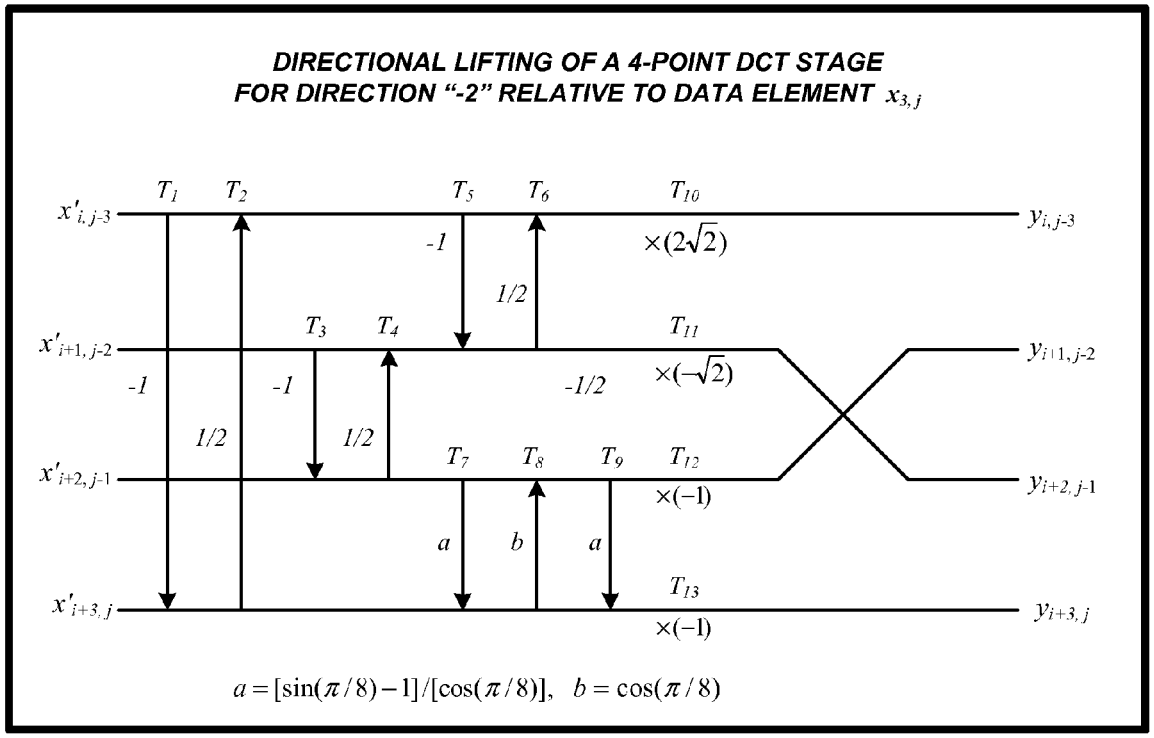
FIG. 7 illustrates a diagram of a lifting implementation of a 4-point directional DCT stage in a lifting-based lapped transform, as described herein.

In particular, given a direction d, each lifting step is directionally skewed by counting the offset caused by the selected direction and selecting the corresponding data element for that offset to populate the corresponding lifting stage. For example, FIG. 3 illustrates four inputs, $\{x_0, x_1, x_2, x_3\}$, to the 4-point pre-filtering stage. These inputs correspond to a conventional vertical pre-filtering stage (i.e., a direction of "0"). However, given a direction of "−2" (relative to data element $x_{i+3,j}$) as illustrated by FIG. 5, the original inputs, $\{x_0, x_1, x_2, x_3\}$, to the pre-filtering stage are replaced with the data elements corresponding to that direction $\{x_{i,j-3}, x_{i+1,j-2}, x_{i+2,j-1}, x_{i+3,j}\}$. As such, the pre-filtering stage becomes a "directional pre-filtering" stage (shown in FIG. 6) by use of directional selection of data elements. Similarly, the output of the directional pre-filtering stage are fed into the DCT stage to create a "directional DCT" stage, as illustrated by FIG. 7. Consequently, the result of the combined directional pre-filtering stage and the directional DCT stage is a directional lapped transform.

More generally, when $P_1$ is applied on $\vec{x(z)} = \{x_0(z), x_1(z), x_2(z), x_3(z)\}^T = \{\Sigma_i x_{i,0} z^{-i}, \Sigma_i x_{i,1} z^{-i}, \Sigma_i x_{i,2} z^{-i}, \Sigma_i x_{i,3} z^{-i}\}^T$ along some direction, such as direction "2", the source corresponding to pixel $x_{i,0}$ is no longer $x_{i,3}$, but $x_{i-3,3}$. These offsets are then incorporated into $P_1$, which becomes:

$$\begin{Bmatrix} 1 & 0 & 0 & -3/32z^3 \\ 0 & 1 & 0 & 0 \\ 0 & 0 & 1 & 0 \\ 0 & 0 & 0 & 1 \end{Bmatrix} \quad \text{Equation (8)}$$

Other lifting steps along a given direction d can be expressed as:

$$P_k(i1, i2, a, d) = I + A \quad \text{Equation (9)}$$

$$= \begin{Bmatrix} 1 & 0 & 0 & 0 \\ 0 & 1 & 0 & 0 \\ 0 & 0 & 1 & 0 \\ 0 & 0 & 0 & 1 \end{Bmatrix} + \begin{Bmatrix} \ldots & \ldots & \ldots \\ \ldots & a \cdot z^{(i2-i1) \cdot d/2} & \ldots \\ \ldots & \ldots & \ldots \end{Bmatrix}$$

where i1 and i2 denote the row number of the destination and the source of that lifting step; A is a matrix with all elements set to 0 except for the i1-th row, i2-th column; and a is the tap of the lifting step. For example, $P_1$ along direction "2" is $P_1(0, 3, -3/32, 2)$ in Equation (9). Note that for a particular lifting step which only does scaling in the DCT stage, e.g., $T_{10}$, where the value is simply scaled by $\sqrt{2}$, Equation (9) is not appropriate. In such cases, there is no difference for scaling steps along different directions. In other words, since the scaling operations of the DCT stage do not rely on particular data elements, they are not replaced with data elements from along the path corresponding to the selected direction.

As illustrated in FIG. 5, directions such as "−1" and "1" do not intersect data elements at every row/column along the direction. In other words, a path along a particular direction may be at some position between columns of data elements for a particular row of data. In this case, values for particular a row/column are determined using techniques such as interpolation, averaging, weighted averaging, motion compensation, etc. For example, in the case of a direction such as "1," in Equation (9), a term $z^{1/2}$ may be shown in the matrix, which means that the offset is of a half-pixel. Thus, as is sometimes done with half-pixel motion compensation, the value for that pixel location can be interpolated from the neighboring pixels as illustrated by Equation (10), where:

$$z^{1/2} \triangleq f(z) \quad \text{Equation (10)}$$

in which f(z) denotes interpolation filter. A special example of f(z) is linear interpolation, where f(z)=(1+z)/2.

By defining each lifting step along a given direction, the pre-filtering and DCT stages along that direction can also be defined as illustrated by Equations (11) and (12), where:

$$\vec{x'(z)} = P(d) \cdot \vec{x(z)} \quad \text{Equation (11)}$$
$$= P_{14}(1, 2, -1, d) \cdot P_{13}(0, 3, -1, d) \cdot \ldots \cdot P_1(0, 3, -3/32, d) \cdot \vec{x(z)}$$

$$\vec{y(z)} = T(d) \cdot \vec{x'(z)} \quad \text{Equation (12)}$$
$$= T_{13} \cdot T_{12} \cdot \ldots \cdot T_1(3, 0, -1, d) \cdot \vec{x'(z)}$$

Therefore, applying Equation (11) and Equation (12) in the pre-filtering and DCT stages of FIG. 2, respectively, the directional lapped transform is constructed to replace the conventional lapped transform. Note that the inverse lifting step of $P_k(i1, i2, a, d)$ is $P_k(i1, i2, -a, d)$. Therefore, inverse directional pre-filtering and inverse directional DCT stages can be easily acquired using Equations (13) and (14), as illustrated below to construct an inverse directional lapped transform, where:

$$P^{-1}(d) = P_1(0,3,3/32,d) \cdot P_2(1,2,3/32,d) \cdot \ldots \cdot P_{14}(1,2,1,d) \quad \text{Equation (13)}$$

$$T^{-1}(d) = T_1(3,0,1,d) \cdot T_2(0,3,-\tfrac{1}{2},d) \cdot \ldots \cdot T_{13} \quad \text{Equation (14)}$$

2.4 Image Coding using Directional Lapped Transforms:

In a tested embodiment, to apply the directional lapped transform described in Section 2.3, the vertical lapped transform of a conventional lapped transform based image coder is replaced with the above-described directional lapped transform. Quantization and entropy coding steps of the modified DLT-based image coder do not need to be changed. However, changes to those steps may also be made to achieve particular coding characteristics if desired.

The whole image is then partitioned into macro-blocks of some desired size, such as, for example, macro-blocks of size 16×16 pixels. For each macro-block, a direction is selected along which the directional lapped transform is performed. This directional design of the lapped transform adapts the transform to local characteristics of the image, while keeping the overhead to code the directional information low. Each macro-block is further divided into 16 blocks with size 4×4 pixels. The directional pre-filtering stage is then applied across the boundaries of blocks, as appropriate, as discussed below with respect to FIG. 8 and FIG. 9. Following the application of the directional pre-filtering stage, the directional DCT stage is applied to the outputs of the directional pre-filtering stage for each block.

Figure 8:
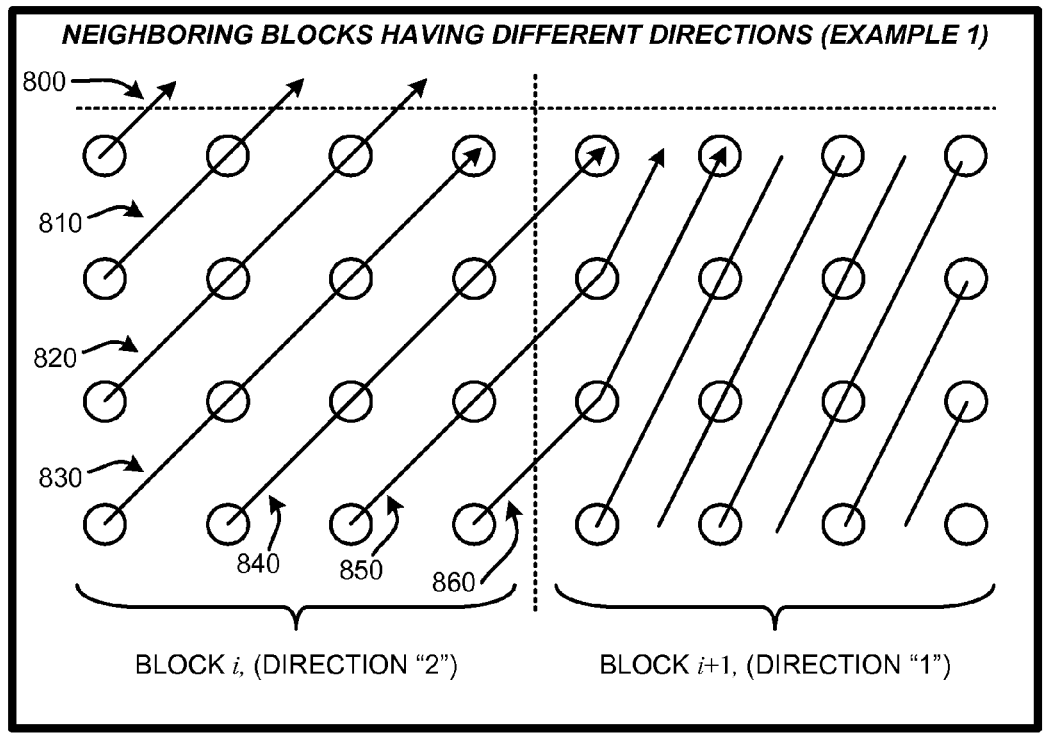
FIG. 8 illustrates an example of neighboring blocks of pixels having different correlation directions and the same sign, as described herein.
Figure 9:
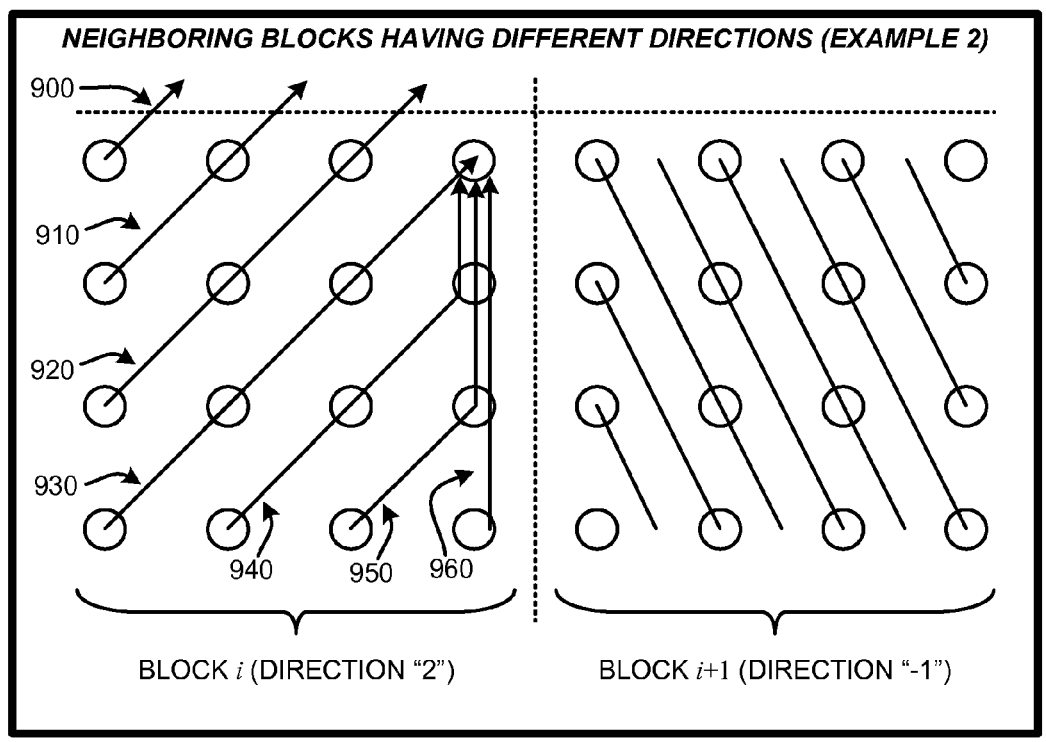
FIG. 9 illustrates an example of neighboring blocks of pixels having different correlation directions and a different sign, as described herein.

In conventional lapped transform based image coding, there is there is only one direction when the 1D lapped transform is performed (e.g., the vertical lapped transform is always vertical—corresponding to direction "0" in FIG. 5). In contrast, the directional lapped transform that replaces the vertical lapped transform for image coding uses a direction computed for every macro block (or at any desired level of granularity, as discussed above). FIG. 8 and FIG. 9 illustrate two cases where neighboring blocks have different directions.

In the first case, illustrated in FIG. 8, neighboring directions (from block i to block i+1) have the same signs (relative to the set of sample directions in FIG. 5). Therefore, the path (e.g., 800, 810, 820, 830, 840, 850, and 860) for each lifting step follows the direction of each pixel, which is the direction of the block to which each pixel belongs. For example, in FIG. 8, within block i, the path grows along direction "2". When the path reaches block i+1, the growth of the path will be along direction "1" (see path 850 and 860, for example). The data values for populating the corresponding directional pre-filtering and directional DCT stages are selected according to these directional paths for each pixel.

However, in the second case, illustrated in FIG. 9, where neighboring directions have different signs (relative to the set of sample directions in FIG. 5), no path is permitted to cross blocks since a directional sign change can represents a boundary or discontinuity of some sort that could produce unwanted artifacts. Therefore, in this case, when the path reaches the block boundary, it grows along direction "0", as shown in FIG. 9 (see path 940, 950 and 960, for example), other paths not reaching this boundary are not affected (see path 900, 910, 920, and 930, for example). In other words, where the sign of the direction changes along a path, that path will be constrained to direction "0" for selection of any data elements (e.g., pixels in this case) for the directional pre-filtering and directional DCT stages. Therefore, in this case, selection of one or more of those data elements will be from the same block rather than allowing selection of any data elements from a neighboring block having a sign change. In addition, it should be noted that although FIG. 8 and FIG. 9 illustrate only two neighboring blocks, neighboring blocks will be on each edge of a block, and as such, paths can cross into other blocks from left, right, up, or down (in the 2D case).

FIG. 8 and FIG. 9 also show that the transform coefficients of a block may be influenced by its neighboring blocks. However, because of the limit support of the bases, only previous and next blocks can make the influence. Therefore, given these two blocks and their directions, the coefficients of the current block along a certain direction can be easily obtained. This allows the rate and distortion to be measured given a quantization step. This capability allows for a direct comparison of the rate and distortion performance of directional lapped transforms for data coding relative to other coding techniques that use conventional lapped transforms.

In general, assuming that direction is determined on a macro-block level, the optimization of direction selection can be expressed as a cost minimization problem, as illustrated by Equation (15), where:

$$\arg\min_{(d1,\ldots,dn)} \sum_{i=1}^{n} \left[ \begin{array}{c} D_i(d1,\ldots,dn) + \\ \lambda \cdot R_i(d1,\ldots,dn) \end{array} \right] \quad \text{Equation (15)}$$

in which d1, ..., dn denote the directions for sequential macro-blocks 1, ..., n; $D_i$ and $R_i$ are the distortion and the rate for macro-block i; and $\lambda$ is an adjustable parameter that may be used, if desired, to vary allowable distortion for a coding rate R. Equation (15) can be solved in a number of ways, such as, for example, by using of conventional dynamic programming techniques.

Further, it should also be noted that other techniques for determining direction can also be applied, if desired, and that such techniques may be applied to individual data elements (e.g., pixels, individual blocks of data elements, neighboring blocks of data elements, etc., depending upon the granularity desired when determining direction. In addition, it should also be noted that in various embodiments, new directions can be determined following the directional pre-filtering stage, such that the directional DCT-stage may use different directions than the directional pre-filtering stage. In this case, the directional information for both stages can be maintained as side information to allow for proper encoding and decoding, as necessary.

After applying the directional lapped transform in place of the vertical transform, a traditional horizontal lapped transform is applied on each row of macro-blocks. Together, the 1D directional lapped transform and the traditional 1D horizontal lapped transform from the 2D lapped transform of the image data. If additional transform levels are to be applied at this point, depending upon the lapped transform based coding being applied, any of those additional levels of lapped transforms can also be modified using directional lapped transforms, as described above, if desired.

For example, in a tested embodiment a conventional multi-level lapped transform based image coder, using macro-blocks of size 16×16, was modified by replacing the vertical lapped transform at the first level with a directional lapped transform, as described above. Then, after the first level directional lapped transform was computed, a second level of directional DCT transform (again replacing the vertical transform) was applied on the 16 DC coefficients corresponding to the sixteen 4×4 blocks within each macro-block to further exploit directional correlations among different blocks. After these two levels of transforms, the resulting coefficients were quantized and coded using conventional coding techniques.

It should be noted that for coding purposes, the directional information is stored as side information to allow the DLT Coder to decode encoded data signals using the correct directional information. This directional side information can be stored in any desired format, or encoded directly into the signal. For example, in one embodiment, a direction for a current block is recorded using a sufficient number of bits. Then, if the next block has the same direction as the current block, a single bit can be used to indicate that the directions are the same. If not, a sufficient number of bits are again used to record the current direction. In various embodiments, since there is only one direction for each macro-block, the overhead to code the directions is very small relative to the space needed to encode the entire image.

By only changing the vertical transform to be directional, the DLT Coder preserves advantages of conventional optimized image coders that are based on lapped transforms, e.g., quality and resolution scalability, high efficient entropy coding, etc. Further, lifting-based techniques are generally fast and memory efficient methods for computing lapped transforms. When decoding, for each lifting step, the offset for each path is calculated from the side information. In one embodiment, this process is accelerated by using a look-up table when there are only a limited number of possible directions. However, the look-up table will increase in size as the number of possible directions increases. Thus, at some point, the use of a look-up table is not more efficient than directly computing the offsets from the side information.

2.5 Additional Embodiments and Considerations of the DLT Coder:

As noted above, the directional lapped transform coder includes blocks or macro-blocks of some pre-determined size. However, depending upon the actual data being processed, fixed block sizes may not always be appropriate. In fact, the granularity of large fixed size macro-blocks may be too large to capture many local changes in images. Therefore, in various embodiments, images are partitioned into variable blocks with different sizes based on the strength of correlation of direction in each block. In particular, a threshold correlation strength or some similar metric can be used to determine when a particular block should be larger or smaller. Then, if the correlation strength of a particular block is too small, for example, the block size can be decreased until sufficient correlation strength is achieved. Conversely, for large relatively constant regions of an image (or other data) larger block sizes may lead to sufficient correlation strength. As noted above, inter-block correlation generally increases in strength as the block size becomes smaller.

Figure 10:
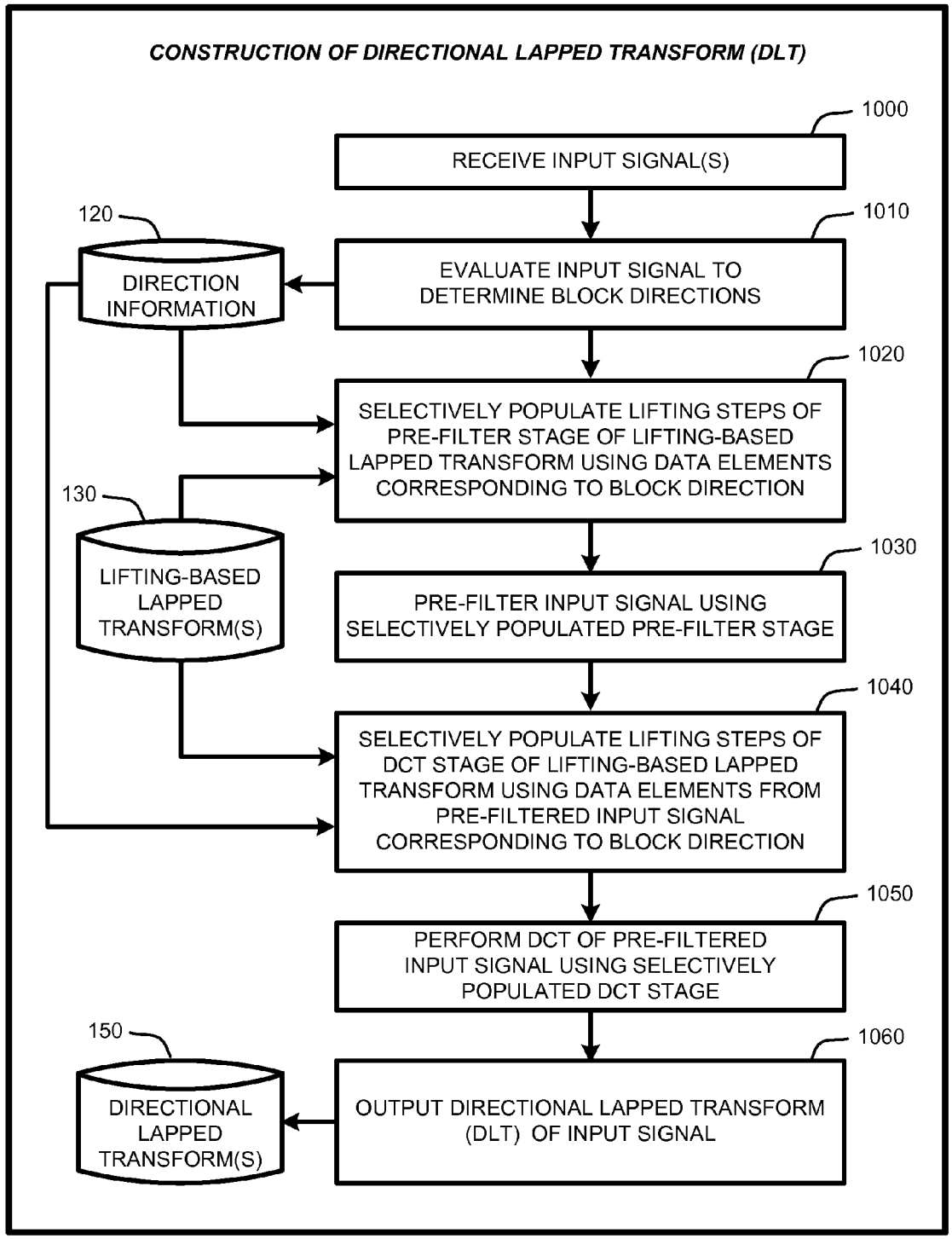
FIG. 10 illustrates a general system flow diagram that illustrates exemplary methods for implementing various embodiments of the directional lapped transform coder, as described herein.

3.0 Operational Summary of the DLT Coder:

The processes described above with respect to FIG. 1 through 9 and in further view of the detailed description provided above in Sections 1 and 2 are illustrated by the general operational flow diagram of FIG. 10. In particular, FIG. 10 provides an exemplary operational flow diagram that illustrates operation of some of the various embodiments of the DLT Coder described above. Note that FIG. 10 is not intended to be an exhaustive representation of all of the various embodiments of the DLT Coder described herein, and that the embodiments represented in FIG. 10 are provided only for purposes of explanation.

Further, it should be noted that any boxes and interconnections between boxes that are represented by broken or dashed lines in FIG. 10 represent optional or alternate embodiments of the directional lapped transform coder described herein, and that any or all of these optional or alternate embodiments, as described below, may be used in combination with other alternate embodiments that are described throughout this document.

In general, as illustrated by FIG. 10, the DLT Coder begins operation by receiving 1000 an input signal. The input signal is then evaluated 1010 to determine block direction information 120. As discussed above, in various embodiments, block size can be fixed or variable in order to achieve a desired degree of correlation strength for direction.

Next, given the block direction information, and a pre-filter stage of the lifting-based lapped transform 130, the DLT Coder selectively populates 1020 the lifting steps of the pre-filter stage using data elements selected from a path corresponding to the block direction information 120. The input signal is then pre-filtered 1030 using the selectively populated pre-filtering stage.

The pre-filtered input signal is then used in combination with the DCT stage of the lifting-based lapped transform 1030 to selectively populate the lifting steps of the DCT stage using data elements from pre-filtered input signal corresponding to the block direction information 130. The pre-filtered input signal is then processed performing 1050 a lift-based DCT using the selectively populated DCT stage to produce and output 1060 a directional lapped transform 150 of the input signal.

Figure 11:
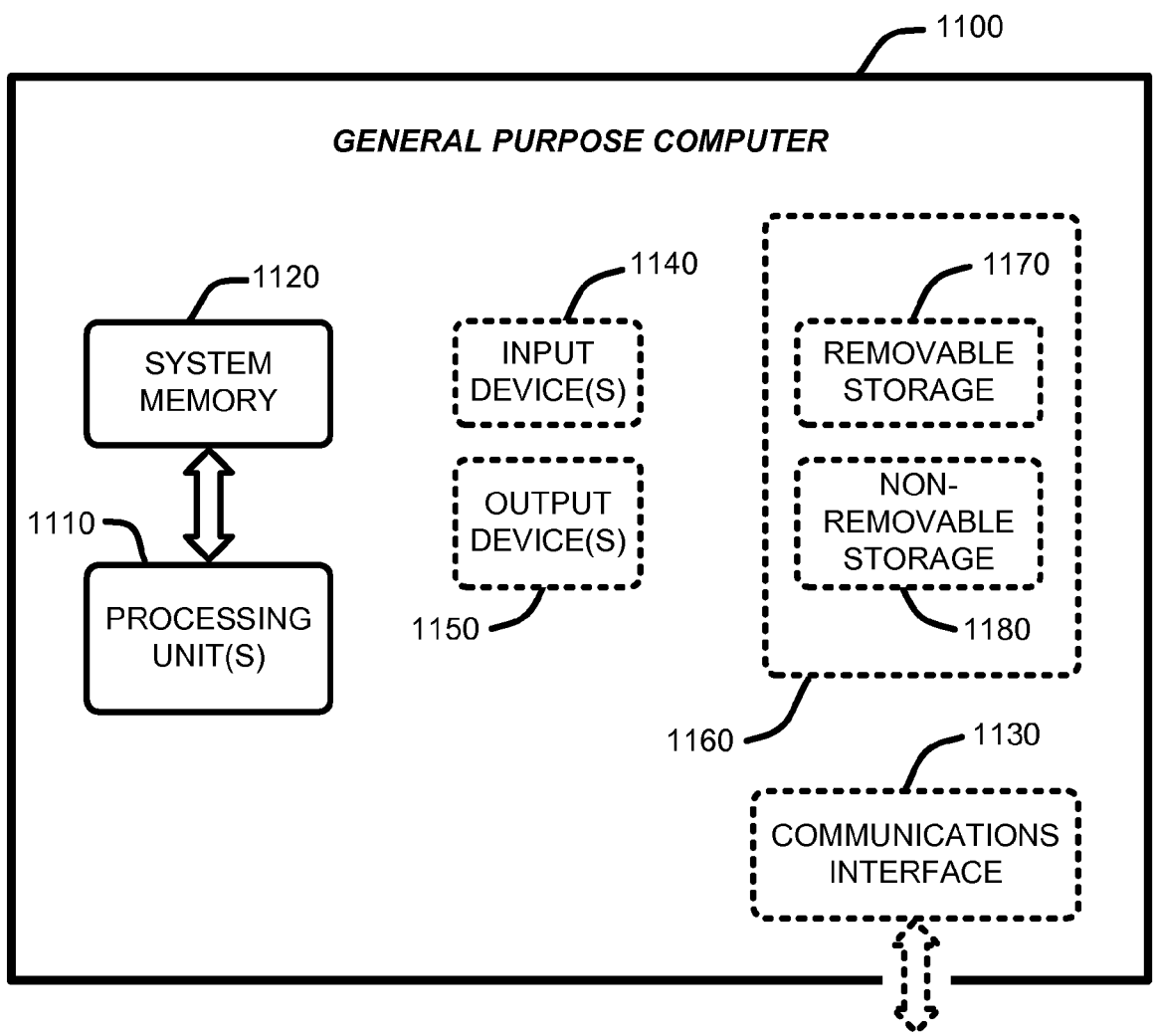
FIG. 11 is a general system diagram depicting a simplified general-purpose computing device having simplified computing and I/O capabilities for use in implementing various embodiments of the DLT Coder, as described herein.

4.0 Exemplary Operating Environments:

The directional lapped transform coder is operational within numerous types of general purpose or special purpose computing system environments or configurations. FIG. 11 illustrates a simplified example of a general-purpose computer system on which various embodiments and elements of the DLT Coder, as described herein, may be implemented. It should be noted that any boxes that are represented by broken or dashed lines in FIG. 11 represent alternate embodiments of the simplified computing device, and that any or all of these alternate embodiments, as described below, may be used in combination with other alternate embodiments that are described throughout this document.

For example, FIG. 11 shows a general system diagram showing a simplified computing device. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, video media players, etc.

At a minimum, to allow a device to implement the DLT Coder, the device must have some minimum computational capability along with some way to access and/or store signal data. In particular, as illustrated by FIG. 11, the computational capability is generally illustrated by one or more processing unit(s) 1110. Note that that the processing unit(s) 1110 of the general computing device of may be specialized microprocessors, such as a DSP, a VLIW, or other microcontroller, or can be conventional CPUs having one or more processing cores.

In addition, the simplified computing device of FIG. 11 may also include other components, such as, for example, a communications interface 1130. The simplified computing device of FIG. 11 may also include one or more conventional computer input devices 1140. The simplified computing device of FIG. 11 may also include other optional components, such as, for example one or more conventional computer output devices 1150. Finally, the simplified computing device of FIG. 11 may also include storage 1160 that is either removable 1170 and/or non-removable 1180. Note that typical communications interfaces 1130, input devices 1140, output devices 1150, and storage devices 1160 for general-purpose computers are well known to those skilled in the art, and will not be described in detail herein.

The foregoing description of the directional lapped transform coder has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the DLT Coder. It is intended that the scope of the invention be limited not by this detailed description, but rather by the claims appended hereto.

What is claimed is:

1. A method for constructing a directional lapped transform for use in transforming a data signal, comprising steps for:
   receiving a separable lapped transform of two or more dimensions in a lifting-based format comprising both a lifting-based pre-filtering stage and a lifting-based discrete cosine transform (DCT) stage for each 1D lapped transform of the separable lapped transform;
   receiving a data signal of the same dimensionality as the separable lapped transform;
   evaluating blocks of the data signal to determine a correlation direction from a range of possible correlation directions for each block; and
   for at least one of the 1D lapped transforms:
      selectively populating lifting steps of the pre-filtering stage with data elements determined by following a path through each corresponding data block using the correlation direction determined for each data block,
      determining outputs of the selectively populated pre-filtering stage to produce pre-filtered data blocks corresponding to the data blocks of the data signal, and selectively populating lifting steps of the DCT stage using the outputs of the selectively populated pre-filtering stage by following a path through each pre-filtered data block using the correlation direction determined for each data block, and determining outputs of the selectively populated DCT stage to produce a directional lapped transform (DLT) of the data signal.

2. The method of claim 1 wherein selectively populating lifting steps of the pre-filtering stage with data elements determined by following a path through each corresponding data block further comprises interpolating new data elements from existing data elements adjacent to the path whenever the path does not intersect a corresponding data element.

3. The method of claim 1 wherein selectively populating lifting steps of the DCT stage using the outputs of the selectively populated pre-filtering stage by following a path through each pre-filtered data block further comprises interpolating new outputs from existing output values adjacent to the path whenever the path does not intersect a corresponding output value.

4. The method of claim 1 wherein any path is prevented from crossing block boundaries when there is a sign change in the correlation direction from one side of a block boundary to the other.

5. The method of claim 1 further comprising a variable block size.

6. The method of claim 5 wherein block size is automatically determined for each block by automatically adjusting block size until a desired level of correlation is achieved.

7. The method of claim 1 wherein a new correlation direction is determined for each pre-filtered data, and wherein the path through each pre-filtered data block follows the new correlation direction for selectively populating lifting steps of the DCT stage.

8. The method of claim 1 wherein the data signal is an image, and further comprising steps for:
   replacing a vertical lapped transform of an image coder with the DLT;
   performing a horizontal lapped transform of the image;
   wherein the combination of the DLT and the horizontal lapped transform of the image represents a 2D lapped transform of the image; and
   encoding the 2D lapped transform of image.

9. A system for constructing a directional lapped transform from an input signal, comprising a processor programmed to control:
   a program module for receiving an input signal of two or more dimensions;
   a program module for factorizing a lapped transform of the same dimensionality as the input signal into a series of lifting steps comprising a lifting-based pre-filtering stage and a lifting-based DCT stage;
   a program module for dividing the input signal into a plurality of blocks of data elements;
   a program module for determining a correlation direction for each of the plurality of blocks of data elements;
   a program module for determining a path from each data element using the correlation direction of each corresponding block of the input signal;
   a program module for selectively populating each lifting step of the pre-filtering stage with data elements selected from along the path;
   a program module for pre-filtering the data signal using the selectively populated lifting steps of the pre-filtering stage to produce corresponding blocks of pre-filtered data elements;
   a program module for selectively populating each lifting step of the DCT stage with pre-filtered data elements selected from along the path; and
   a program module for computing a DCT of the pre-filtered data elements using the selectively populated lifting steps of the DCT stage to produce a directional lapped transform of the input signal.

10. The system of claim 9 wherein selectively populating lifting steps of the pre-filtering stage further comprises computing a new data element from existing data elements adjacent to the path whenever the path does not intersect a corresponding data element.

11. The system of claim 9 wherein selectively populating each lifting step of the DCT stage further comprises computing a new pre-filtered data element from existing pre-filtered data elements adjacent to the path whenever the path does not intersect a corresponding pre-filtered data element.

12. The system of claim 9 wherein any path is prevented from crossing block boundaries when there is a sign change in the correlation direction across the boundary of adjacent blocks.

13. The system of claim 9 wherein block size is automatically determined for each block by automatically adjusting block size until a desired level of correlation is achieved for the correlation direction of each block.

14. The system of claim 9 wherein the input signal is an image, and further comprising:
   a program module for replacing a vertical lapped transform of an image coder with the directional lapped transform;
   performing a horizontal lapped transform of the image;
   wherein the combination of the directional lapped transform and the horizontal lapped transform of the image represents a 2D lapped transform of the image; and
   encoding the 2D lapped transform of image.

15. A computer-readable medium, which does not consist of a modulated data signal or carrier wave, having computer executable instructions stored therein for encoding an image, said instructions comprising:
   receiving an image;
   receiving a 2D separable lapped transform comprising a 1D vertical lapped transform and a 1D horizontal lapped transform;
   performing lifting factorization of the 1D vertical lapped transform to construct a pre-filtering stage and a DCT stage, each stage comprising a series of lifting steps;
   dividing the input signal into a plurality of blocks of data elements; determining a correlation direction for each of the plurality of blocks;
   selectively modifying lifting steps of the pre-filtering stage and the DCT stage with data elements selected from corresponding blocks by following a path from each data element derived from the correlation direction of each corresponding block;
   applying the modified lifting steps of the pre-filtering stage and the DCT stage to the image to construct a directional lapped transform of the image;
   applying the horizontal lapped transform to the image;
   quantizing transform coefficients resulting from application of the directional lapped transform and the horizontal lapped transform to the image; and
   entropy coding the quantized transform coefficients to produce an encoded version of the image.

16. The computer-readable medium of claim 15 wherein selectively modifying lifting steps of the pre-filtering stage and the DCT stage further comprises computing a new data element from existing data elements adjacent to the path whenever the path does not intersect a corresponding data element.

17. The computer-readable medium of claim 15 wherein any path is prevented from crossing block boundaries when there is a sign change in the correlation direction across the boundary of adjacent blocks.

18. The computer-readable medium of claim 15 wherein block size is automatically determined for each block by automatically adjusting block size until a desired level of correlation is achieved for the correlation direction of each block.

19. The computer-readable medium of claim 15 wherein the block size is adjustable via a user interface.

20. The computer-readable medium of claim 15 wherein the correlation direction is continuously variable in a range from 0 degrees to 360 degrees.

* * * * *